United States Patent
Agin

(10) Patent No.: US 7,167,719 B2
(45) Date of Patent: Jan. 23, 2007

(54) METHOD FOR CONTROLLING TRANSMISSION POWER IN A MOBILE RADIOCOMMUNICATION SYSTEM

(75) Inventor: Pascal Agin, Sucy en Brie (FR)

(73) Assignee: Evolium SAS, Paris (FR)

( * ) Notice: Subject to any disclaimer, the term of this patent is extended or adjusted under 35 U.S.C. 154(b) by 560 days.

(21) Appl. No.: 10/416,795

(22) PCT Filed: Nov. 15, 2001

(86) PCT No.: PCT/FR01/03585

§ 371 (c)(1),
(2), (4) Date: May 15, 2003

(87) PCT Pub. No.: WO02/41522

PCT Pub. Date: May 23, 2002

(65) Prior Publication Data

US 2004/0106371 A1    Jun. 3, 2004

(30) Foreign Application Priority Data

Nov. 17, 2000 (FR) .................................. 00 14908

(51) Int. Cl.
*H04Q 7/20* (2006.01)

(52) U.S. Cl. .................. 455/522; 455/69; 455/442; 455/436; 370/318

(58) Field of Classification Search ............ 455/522, 455/442, 436, 69, 430, 437, 450, 453, 13.4, 455/127.1; 370/318, 331, 332, 317, 320
See application file for complete search history.

(56) References Cited

U.S. PATENT DOCUMENTS

| 6,823,193 B1 * | 11/2004 | Persson et al. ............. 455/522 |
| 6,975,615 B1 * | 12/2005 | Toskala et al. ............. 370/342 |
| 2002/0003785 A1 | 1/2002 | Agin | |

OTHER PUBLICATIONS

Oscar Salonaho et al, "Flexible Power Allocation for Physical Control Channel in Wideband CDMA", Vehicular Technology Conference, 1999 IEEE 49$^{th}$ Houston, Texas, US, May 16-20, 1999, IEEE, pp. 145-1458, XP0101342093 dated May 16, 1999.

"Universal Mobile Telecommunications Systems (UMTS), Physical Layer Procedures 9FDD) (3GPP TS 25.214 version 3.4.0 Release 1999)", ETSI TS 125 214 V3.4.0—Sep. 2000, pp. 1-47, XP002173278.

\* cited by examiner

*Primary Examiner*—Edan Orgad
*Assistant Examiner*—Dominic E. Rego
(74) *Attorney, Agent, or Firm*—Sughrue Mion, PLLC

(57) ABSTRACT

A method of controlling transmission power in a mobile radiocommunications system, in which at least two distinct physical channels transmitted by a single transmitter have their respective transmission powers controlled by a power control algorithm as a function of a target value for transmission quality (SIR target) correspond to a first channel which is taken as a reference, and in which, for a second channel, a transmission power offset (PO) relative to the first channel is applied, where necessary, the method being essentially characterized in that when there is a change in the required transmission conditions, a variation having a first value ($\Delta 1$) is applied to said target value (SIR target), and a variation having a second value ($\Delta 2$) is applied to said power offset (PO) so that said first channel has its transmission power changed by said first value and the second channel has its transmission power changed by a value equal to the difference ($\Delta 1 - \Delta 2$) between said first and second values.

27 Claims, 2 Drawing Sheets

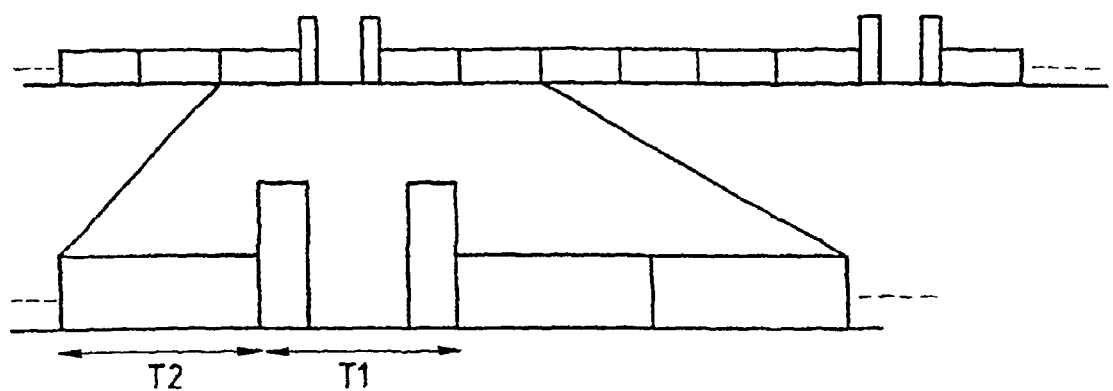
FIG_1
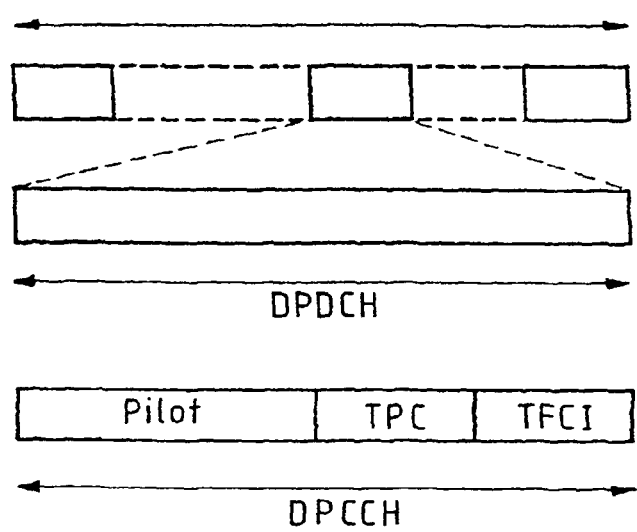
FIG_2

FIG_3
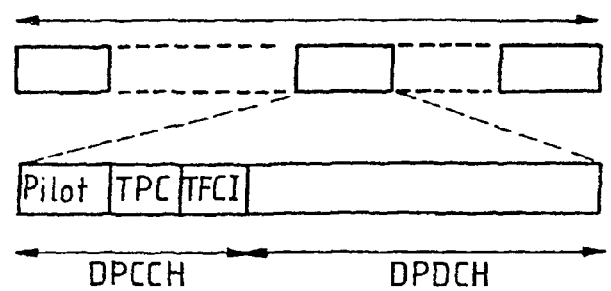
FIG_4
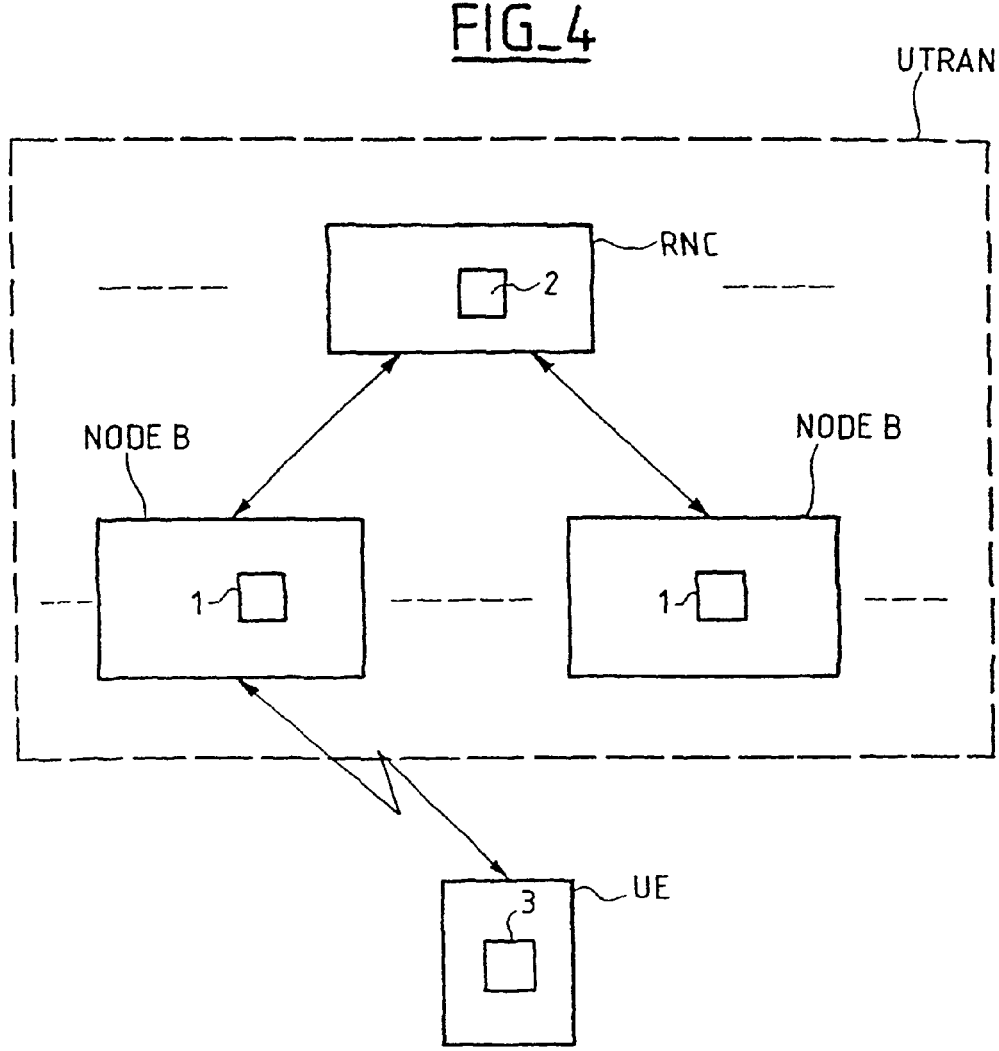

METHOD FOR CONTROLLING TRANSMISSION POWER IN A MOBILE RADIOCOMMUNICATION SYSTEM

The present invention relates in general to mobile radio-communications systems, and in particular to systems using code division multiple access (CDMA).

The present invention is particularly applicable to so-called "third generation" systems such as the universal mobile telecommunications system (UMTS).

In general, in such systems, one of the objects is to increase performance, i.e., in particular, to increase capacity and/or to increase quality of service.

One technique in common use is the power control technique, and in particular the so-called "closed loop power control" technique.

The purpose of controlling power in a closed loop is to ensure that for each link between the base station and a mobile station, a parameter that is representative of the quality of transmission over the link (such as signal-to-interference ratio (SIR) for example) is maintained as close as possible to a target value. For example, in the up direction (i.e. from the mobile station to the base station), the base station periodically estimates SIR and compares the estimated SIR with a target SIR value. If the estimated SIR is less than the target SIR, then the base station requests the mobile station to increase its transmission power. In the opposite situation, if the estimated SIR is greater than the target SIR, then the base station requests the mobile station to reduce its transmission power.

The value of the target SIR is an important parameter in such systems. If the target SIR is set at a value higher than the value needed, then the level of interference within the system is pointlessly increased, so system performance is pointlessly degraded; conversely, if the target SIR is set at a value that is lower to the value needed, then the quality of service is degraded on the link in question.

The target SIR value is generally selected as a function of the required quality of service and is commonly adjusted by means of an outer loop algorithm (in opposition to the preceding algorithm which is also known as the inner loop algorithm). The principle of the outer loop algorithm is to make a regular estimate of quality of service and to compare the estimated quality of service with the required quality of service. Quality of service is generally represented by a bit error rate (BER) or by a frame error rate (FER) for speech services, or indeed by a block error rate (BLER) for packet data services. If the estimated quality of service is less than the required quality of service, then the target SIR is increased, otherwise the target SIR is reduced.

Unlike the inner loop algorithm which needs to be fast in order to track variations in SIR as closely as possible, the outer loop algorithm needs to be slower, since quality must be averaged over a certain period in order to obtain a reliable estimate. Typically, in systems such as the UMTS in which information is transmitted structured in frames, themselves structured in time slots, the SIR of the received signal is estimated and compared with the target SIR at each time slot of a frame, whereas quality is averaged over several frames.

This lack of speed in the outer loop algorithm can nevertheless give rise to certain problems, particularly when there is a change in the required quality of service, for example:

a change in transmission mode, from a "non-compressed" mode to a "compressed" mode, or vice versa;

a change in required service (in particular a change in transmission rate);

a change in transmission rate for a given required service (such as packet data services, for example);

a change in surrounding conditions (e.g. the speed of the mobile station, radio propagation conditions);

etc.

Below, attention is given more particularly to the problems posed for power control by the use of compressed mode.

In a system such as the UMTS, for example, compressed mode in the down direction has been introduced in order to enable a mobile station (also known as "user equipment" (UE)), in order to perform measurements in the down direction on a frequency other than the frequency in use. It consists essentially in stopping transmission in the down direction over a certain duration referred to herein as the transmission gap duration.

This is summarized by means of FIG. 1, which applies to the case of information being transmitted in frame form and which shows a series of successive frames comprising both frames that have been compressed (such as T1, for example) and that include transmission gaps referenced TG, and frames that are not compressed (such as T2, for example) and that do not include any transmission gaps.

During compressed frames, the quantity of data transmitted outside the transmission gaps thus needs to be adapted to take account of the transmission gaps. The target SIR then needs to be adjusted accordingly, otherwise there is a risk of performance being degraded.

In addition, since closed loop power control is not active throughout the duration of a transmission gap, performance is degraded in significant manner, particularly during the compressed frame and during one or more "recovery" frames following the compressed frame. The amount of degradation can be as much as several decibels (dB). In order to maintain the same quality of service as in normal (non-compressed) mode, these effects also need to be compensated by increasing the target SIR during these frames.

Nevertheless, since the outer loop algorithm is a slow process, it is probably necessary for several frames to pass before changing the target SIR in corresponding manner, and the target SIR even risks being increased immediately after compressed or recovery frames, at a time when it is no longer needed, giving rise under all circumstances to degraded performance.

In European patent application No. 99401766.3, filed on Jul. 13, 1999 by the Applicant, a solution is proposed for avoiding such performance degradation in compressed mode.

Briefly, the idea on which that prior application is based is to anticipate variation in target SIR, i.e. to apply a corresponding variation ΔSIR in anticipation to the target SIR.

According to another idea contained in that prior application, the increase in target SIR due to the increase in instantaneous data rate, and the increase δSIR in the target SIR due to degraded performance in compressed frames (i.e. due to transmission gaps) can be separated.

Specifically, in the down direction, for example, since variation in data rate is known to the UE, only the additional increase in target SIR, δSIR, that is due to performance being degraded during compressed frames needs to be signaled by the network to the UE. The additional load on signaling resources that is needed can be small if this variation is signaled together with the other compressed mode parameters (including the durations of transmission gaps, their periods, . . . ).

The UE can then increase the target SIR by ΔSIR immediately prior to the compressed frame (or immediately after the transmission gap of the compressed frame) and can reduce it by the same amount immediately after the compressed frame. This variation in target SIR is additional to the conventional outer loop algorithm which needs to take it into account.

According to another idea contained in that prior application, at least when the transmission gap is at the end of a compressed frame, performance during recovery frames can also be degraded because of the gap in power control during the transmission gap. It would thus also be desirable to increase target SIR during recovery frames and to signal this increase in target SIR to the UE. Alternatively, the same value δSIR for the compressed frames could be used so as to reduce the amount of signaling needed.

Thus, according to that prior application, by anticipating variation in target SIR during compressed frames and recovery frames, the effectiveness of outer loop power control in compressed mode is increased.

According to another idea contained in that prior application, the UE can simultaneously increase its transmission power in the same proportion before the compressed frame, and can likewise reduce it in the same proportion after the compressed frame. This makes it possible to avoid the drawback due in particular to the stepwise operation of the inner loop algorithm, thus making it possible to reach more quickly the new target SIR value (for example, if the change in target SIR is 5 dB, and if the power control stepwise is 1 dB, then with the conventional inner loop algorithm five time slots would be needed to reach the new target value).

Thus, in that prior application, by also anticipating variation in transmission power, the effectiveness of the inner power control loop in compressed mode is likewise increased.

The variation in target value, written ΔSIR, can be obtained as described in European patent application No. 00400357.0 filed on Feb. 8, 2000 by the Applicant.

It is recalled that a characteristic of a system such as the UMTS is the possibility of transporting a plurality of services over a single connection, i.e. a plurality of transporting channels over a single physical channel. Such transport channels (TrCH) are processed separately depending on the channel coding scheme (including error detector coding, error correction coding, data rate adaptation, and interleaving) prior to being time multiplexed in order to form a coded composite transport channel (CCTrCH) to be spread over one or more physical channels. Processing in application of the channel coding scheme is performed over transmission time intervals (TTI). In this channel coding scheme, adapting data rate includes two puncturing and repetition techniques; in addition, interframe interleaving is performed over the TTI length, or interleaving depth. Each TTI is then segmented into frames, and time multiplexing and sharing over physical channels are subsequently performed frame by frame. In addition, each of the various transport channels TrCHi (i=1, . . . , n) which are multiplexed to form a CCTrCH has its own TTI length, written TTIi. More information on these aspects of the UMTS can be found in the document 3G TS25 212 V3.0.0 published by the 3GPP.

As described in the second above-mentioned prior patent application, the value ΔSIR can be obtained using the following expression:

$$\Delta SIR = \max(\Delta SIR1\_\text{compression}, \ldots, \Delta SIRn\_\text{compression}) + \Delta SIR\_\text{coding}$$

where n is the number of lengths of transmission time intervals (TTI) for all of the transport channels TrCH of a coded composite transport channel CCTrCH, and where ΔSIR_coding satisfies:

ΔSIR_coding=DeltaSIR for compressed frames;
ΔSIR_coding=DeltaSIRafter for recovery frames;
ΔSIR_coding=0 otherwise and ΔSIRi_compression is defined by:

if the frames are compressed by puncturing:
  ΔSIRi_compression=10 Log(N*$F_i$/(N*$F_i$−$TGL_i$)) if there is a transmission gap in the current TTI of length $F_i$ frames, where $TGL_i$ (for "transmission gap length") is the duration of the transmission gap measured as a number of transmission gaps, giving either a single transmission gap or a sum of a plurality of transmission gaps, within the current TTI of length $F_i$ frames, where N is the number of time slots per frame; or
  ΔSIRi_compression=0 otherwise if the frames are compressed by reducing the spreading factor;
  ΔSIRi_compression=10 Log($R_{CF}$/R) for each compressed frame where R is the instantaneous net data rate before and after the compressed frame, and where $R_{CF}$ is the instantaneous net data rate during the compressed frame (it being understood that the term "instantaneous net data rate" means that for a compressed frame, the period used for calculating the data rate is not the full period of the frame, but only that fraction of said period of the frame during which data is being transmitted); for example, in the down direction, 10 Log($R_{CF}$/R) is equal to 3 dB for the UMTS, in which rate matching is the same for compressed frames and for non-compressed frames when the mode of compression by reducing the spreading factor by 2 is used. In the up direction, ΔSIRi_compression is equal to 10 Log((15−TGL)/15) because rate matching is not the same for compressed frames and for non-compressed frames. In addition, when only the information rate is produced, so as to have no need to compress frames by modifying the repetition/puncturing ratio and/or the spreading factor (which method is also known as "higher layer scheduling"), the term ΔSIRi_compression is equal to zero; or
  ΔSIRi_compression=0 otherwise.

In this algorithm, max (ΔSIR1_compression, . . . , ΔSIRn_compression) correspond to a first component, and ΔSIR_coding corresponds to a second component for said variation of target value.

In this algorithm, the second component ΔSIR_coding has values that differ for compressed frame and for recovery frames, respectively DeltaSIR and DeltaSIRafter.

Other algorithms or variants could be envisaged, in particular, as also described in the second above-mentioned prior patent application:

in the special case of a transmission gap beginning in a first frame and ending in a consecutive second frame (corresponding to the so-called "double-frame method" in UMTS), the second compressed frame (with the second portion of the transmission gap) is considered as being the recovery frame (ΔSIR_coding=DeltaSIRafter). Under such circumstances, the first frame following the two consecutive frames in question is not considered as being a recovery frame (ΔSIR_coding=0);

alternatively, the second compressed frame may be considered as being a compressed frame (ΔSIR_coding= DeltaSIR) and the first frame which follows the two consecutive frames in question can be considered as being a recovery frame (ΔSIR_coding=DeltaSIRafter);

in another alternative, the second compressed frame can be considered as being a compressed frame and a recovery frame (ΔSIR_coding=DeltaSIR+DeltaSIRafter, or any other combination), or more generally, and in order to reduce the quantity of signaling needed and its complexity, the component ΔSIR_coding can be determined on the basis of the values DeltaSIR and DeltaSIRafter without it being necessary to signal any other value.

It is recalled that in a system such as the UMTS in particular, different so-called "dedicated" physical channels can be transmitted simultaneously by a single transmitter (e.g. in the up direction by the mobile station or "UE" in UMTS).

Two types of dedicated physical channel can be distinguished:

dedicated physical data channels (DPDCH); and
dedicated physical control channels (DPCCH).

In connected mode, each UE is allocated one DPCCH and one or more DPDCH, depending on requirements.

In the up direction, as shown in FIG. 2, the channels DPDCH and DPCCH are multiplexed by codes within each frame.

In the down direction, as shown in FIG. 3, the channels DPDCH and DPCCH are time multiplexed within each frame.

As shown in FIGS. 2 and 3, the DPCCH channel has three fields:

a "pilot" field containing pilot bits serving in particular to conserve synchronization between base station and mobile station, and also to make estimates of the propagation channel;

a transmit power control command (TPC) field containing power control command bits for use by the inner power control loop; and a transport format combination indicator (TFCI) field containing transport format indicator bits for use by each of the DPDCH channels to indicate the transport format in use (including in particular the coding scheme, the interleaving, . . . , etc., depending on the corresponding service).

In the above-mentioned prior patent applications, the target SIR is assumed to be expressed relative to the DPDCH.

Unfortunately, in the 3rd generation partnership project (3GPP), it is specified that the target SIR should be expressed relative to the DPCCH. In addition, in that standard, the DPDCH and the DPCCH may have different transmission powers in the up direction (30 different values being possible for the power difference between these two channels), and in the down direction the three fields of the DPCCH (pilot, TFCI, and TPC) and the DPDCH may have different transmission powers (so that four different values are possible).

In general, the transmission power difference or "offset" between DPDCH and DPCCH is identical in compressed mode and in normal mode. This general case is that specified by the 3GPP standard for the down direction. Under such circumstances, the target SIR is expressed in exactly the same manner relative to DPCCH and to DPDCH, and the solutions proposed in the above-mentioned prior patent applications apply equally to this situation.

Unfortunately, when the transmission power offset between DPDCH and DPCCH is not identical in compressed mode and in normal mode (which corresponds to the specification of the 3GPP standard for the up direction), the solutions of those above-mentioned prior patent applications are not applicable and are not directly transposable. In particular, the prior patent applications do not make provision for the possibility of changing the power of the DPCCH, but only for changing the power of the DPDCH.

A particular object of the present invention is to provide a solution to this new problem.

The present invention thus provides a method of controlling transmission power in a mobile radiocommunications system, in which at least two distinct physical channels transmitted by a single transmitter have their respective transmission powers controlled by a power control algorithm as a function of a target value for transmission quality correspond to a first channel which is taken as a reference, and in which, for a second channel, a transmission power offset relative to the first channel is applied, where necessary, the method being characterized in that when there is a change in the required transmission conditions, a variation having a first value is applied to said target value, and a variation having a second value is applied to said power offset so that said first channel has its transmission power changed by said first value and the second channel has its transmission power changed by a value equal to the difference between said first and second values.

In a first implementation:

said first value is equal to 0; and
the difference between said first and second values corresponds to the variation in power to be applied to the second channel.

In a second implementation:

said first value corresponds to a component of the variation in the power to be applied to the first channel; and
the difference between said first and second values corresponds to the difference between said power variation component to be applied to the first channel and the power variation to be applied to the second channel.

In a third implementation:

said first value corresponds to the power variation to be applied to the first channel; and
the difference between said first and second values corresponds to the difference between a power variation component to be applied to the first channel and a power variation component to be applied to the second channel.

In particular, said change in required transmission conditions may correspond to using compressed mode.

In an example, said first channel is a control channel.
In an example, said second channel is a data channel.

According to another characteristic, said power variation component to be applied to the control channel is a component for compensating a change in the number of pilot bits for a pilot channel transmitted in said control channel, said number of pilot bits possibly differing between compressed frames and normal frames.

According to another characteristic, said power variation to be applied to the control channel comprises a component for compensating a change in the number of pilot bits for a pilot signal transmitted in said control channel, the number of pilot bits possibly differing between compressed frames and normal frames, together with a component for compensating the performance degradation due to the transmission gaps in compressed mode.

In one possibility, said method is used for controlling power in the up direction.

In another possibility, said method is used for controlling power in the down direction.

The present invention also provides various entities of a mobile radiocommunications system capable of including means for enabling a method of the invention to be implemented.

Thus, the invention also provides a base station for a mobile radiocommunications system, said base station being essentially characterized in that it includes means for implementing a method in accordance with the invention.

According to another characteristic, in order to control power in the up direction, said base station includes means for applying a variation having said first value to said target value.

According to another characteristic, in order to control power in the down direction, said base station includes means for applying a variation having said second value to said power offset.

According to another characteristic, in order to control power in the up direction, said base station includes means for signaling to a mobile station said variation having said second value for application to said power offset.

The invention also provides a base station controller for a mobile radiocommunications system, said base station controller being essentially characterized in that it includes means for implementing a method in accordance with the invention.

According to another characteristic, in order to control power in the up direction, said base station controller includes means for applying a variation having said first value to said target value.

According to another characteristic, in order to control power in the down direction, said base station controller includes means for applying a variation having said second value to said power offset.

According to another characteristic, in order to control power in the up direction, said base station controller includes means for signaling to a mobile station said variation having said second value to be applied to said power offset.

The invention also provides a mobile station for a mobile radiocommunications system, said mobile station being essentially characterized in that it includes means for implementing a method in accordance with the invention.

According to another characteristic, in order to control power in the down direction, said mobile station includes means for applying a variation having said first value to said target value.

According to another characteristic, in order to control power in the up direction, said mobile station includes means for applying a variation having said second value to said power offset.

According to another characteristic, in order to control power in the down direction, said mobile station includes means for signaling to a network said variation having said second value for application to said power offset.

The invention also provides a mobile radiocommunications system, said system including at least one such base station, and/or at least one such base station controller, and/or at least one such mobile station.

The present invention also provides a method of controlling transmission power in a mobile radiocommunications system, in which a data channel and a control channel transmitted by a single transmitter have their respective transmission powers controlled by a power control algorithm as a function of a target value for transmission quality corresponding to the control channel which is taken as a reference, and in which, for the data channel, a transmission power offset relative to the control channel is applied, where necessary, which method is characterized in that in the event of a change in transmission conditions being required, corresponding to using compressed mode, a variation is applied to said target value, said variation comprising a component for compensating a change in the number of pilot bits for a pilot signal transmitted in said control channel, where said number of pilot bits possibly differing between compressed frames and normal frames, together with a component for compensating the performance degradation due to the transmission gaps in compressed mode.

The present invention also provides a base station for a mobile radiocommunications system, said base station being essentially characterized in that it includes means for implementing such a method.

According to another characteristic, in order to control power in the up direction, said base station includes means for applying a variation to said target value, which variation comprises a component for compensating a change in the number of pilot bits for a pilot signal transmitted in said control channel, said number of pilot bits possibly differing between compressed frames and normal frames, together with a component for compensating the performance degradation due to the transmission gaps in compressed mode.

The present invention also provides a base station controller for a mobile radiocommunications system, said base station controller being essentially characterized in that it includes means for implementing such a method.

According to another characteristic, in order to control power in the up direction, said base station controller includes means for applying a variation to said target value, which variation comprises a component for compensating a change in the number of pilot bits for a pilot signal transmitted in said control channel, said number of pilot bits possibly differing between compressed frames and normal frames, together with a component for compensating the performance degradation due to the transmission gaps in compressed mode.

The present invention also provides a mobile station for a mobile radiocommunications system, said mobile station being essentially characterized in that it includes means for implementing such a method.

According to another characteristic, in order to control power in the down direction, said mobile station includes means for applying a variation to said target value, said variation comprising a component for compensating a change in the number of pilot bits for a pilot signal transmitted in said control channel, said number of pilot bits possibly differing between compressed frames and normal frames, together with a component for compensating the degradation in performance due to the transmission gaps in compressed mode.

Other objects and characteristics of the present invention appear on reading the following description of implementations, given with reference to the accompanying drawings, in which:

FIG. 1 is a diagram for outlining the principle of transmission in compressed mode;

FIGS. 2 and 3 are diagrams for outlining frame structure for the DPCCH and DPDCH channels, respectively for the up direction and for the down direction, in a system such as the UMTS, in particular; and FIG. 4 is a diagram for showing an example of means that need to be provided in a mobile radiocommunications system, such as the UMTS, in particular, in order to implement a method in accordance with the invention, for example in order to control power in the up direction.

The invention may thus be presented as follows.

The invention relates to the general case where target SIR is expressed relative to a certain reference channel or "first" channel (in practice the DPCCH), and where said reference channel has its transmission power offset by a power offset (PO) relative to a second channel (in practice the DPDCH).

For the sake of clarity, reference below is made specifically to the channels DPCCH and DPDCH, but the invention it not limited in any way to this particular case.

By definition, PO (dB)=10 $Log(P_{DPCCH}/P_{DPDCH})$, where $P_{DPCCH}$ and $P_{DPDCH}$ designate the transmission powers on the channels DPCCH and DPDCH respectively.

In very general manner, in order to change (durably) the power of the channels DPCCH and DPDCH in a frame and relative to another frame, there are two options:
  changing the power offset PO: for an unchanged SIR, this makes it possible to change the power of the DPDCH only; or
  changing the target SIR: for an unchanged power offset PO this serves to change the transmission power of both the DPCCH and the DPDCH simultaneously by the same amount.

More precisely, in order to change the power of the DPCCH by a value $\Delta 1$ (in dB), and the power of the DPDCH by a value $\Delta 2$ (in dB) it is necessary:
  to increase the power offset PO (in dB) by ($\Delta 1-\Delta 2$) dB; and
  to increase the target SIR by $\Delta 1$ dB.

Below, we refer more particularly to compressed mode. In compressed mode, as described in the above-referenced prior patent applications, and as recalled above, the intention is to increase the power of the DPDCH in order to compensate for:
  the increase in data rate (in the compressed frames, or throughout the TTI including the compressed frame when puncturing compressed mode is used); and
  the degradation in performance due to the transmission gaps (a gap in power control, excessive puncturing when using puncturing mode compression, . . . ).

Referring specifically to the power of DPCCH (which was thus not the subject of those prior patent applications), there are several possibilities that are of interest:
  No change in DPCCH power. This can be obtained by changing solely the power offset PO, leaving an unchanged target SIR.
  Changing the power of the DPCCH in order to have the same pilot signal energy per time slot in the frame (or possibly the same energy for some other field of the pilot channel). This can be achieved by simultaneously changing the power offset and varying the target SIR.
  Changing the power of the DPCCH in order to compensate for a change in the number of pilot bits (which can be different in compressed frames and normal frames, as specified in the 3GPP standard) as in the second above possibility, and also compensate for degradation in performance due to transmission gaps (as for the DPDCH).

The third possibility may be preferred since it corresponds better to the present 3GPP standard.

In the first case, it is possible to write:

$$SIR_{cm\_target}=SIR_{target}$$

$$PO_{cm}=PO-\Delta SIR\_\text{compression}-\Delta SIR1\_\text{coding}-\Delta SIR2\_\text{coding}$$

The second case can be written:

$$SIR_{cm\_target}=SIR_{target}+\Delta_{PILOT}$$

$$PO_{cm}=PO+\Delta_{PILOT}+\Delta SIR\_\text{compression}-\Delta SIR1\_\text{coding}-\Delta SIR2\_\text{coding}$$

In the third case it is possible to write:

$$SIR_{cm\_target}=SIR_{target}+\Delta_{PILOT}+\Delta SIR\_\text{coding}+\Delta SIR2\_\text{coding}$$

$$PO_{cm}=PO+\Delta_{PILOT}+\Delta SIR\_\text{compression}$$

In these various expressions:
  $SIR_{cm\_}$target is the target SIR in compressed mode;
  $SIR_{target}$ is the target SIR in normal mode;
  $PO_{cm}$ is the power offset in compressed mode;
  PO is the power offset in normal mode (in practice PO can be equal to a value signaled by the RNC or base station controller or calculated from values signaled by the RNC (e.g. the gains $\beta_c$ and $\beta_d$ as specified below));
  $\Delta_{PILOT}$ corresponds to the power variation to be applied to the DPCCH, in this example in the up direction, in application of the 3GPP standard:
  $\Delta_{PILOT}=10\ Log_{10}(N_{pilot,N}/N_{pilot,curr})$ where $N_{pilot,N}$ is the number of pilot bits per time slot in a frame in which there is no transmission gap, and $N_{pilot,curr}$ is the number of pilot bits per time slot in the current frame;
  $\Delta SIR\_\text{compression}$ is defined, for example in the up direction by:
  $\Delta SIR\_\text{compression}=10\ Log(15/(15-TGL))$ dB if there is a transmission gap in the current frame for compressed mode by halving the spreading factor, where TGL is the length of the transmission gap in number of time slots in the frame in question, and where 15 is the number of time slots in a frame;
  $\Delta SIR\_\text{compression}=0$ dB in all other cases.
  $\Delta SIR1\_\text{coding}$ and $\Delta SIR2\_\text{coding}$ are calculated form the parameters DeltaSIR1, DeltaSIR2, DeltaSIRafter1, DeltaSIRafter2 signaled as follows by the upper layers for the direction in question or for the opposite direction (taking the case of patterns formed by two successive transmission gaps):
  $\Delta SIR1\_\text{coding}$=DeltaSIR1 if the beginning of the first transmission gap of a pattern lies within the current frame (DeltaSIR1 is a variation of target SIR in the up direction during the frame containing the beginning of the first transmission gap of the pattern);
  $\Delta SIR1\_\text{coding}$=DeltaSIRafter1 is the current frame immediately follows a frame containing the beginning of the first transmission gap of the pattern (DeltaSIRafter1 is a variation of target SIR in the up direction one frame after the frame containing the beginning of the first transmission gap of the pattern);
  $\Delta SIR2\_\text{coding}$=DeltaSIR2 if the beginning of the second transmission gap of a pattern lies within the current frame (DeltaSIR2 is a variation in target SIR in the up direction during the frame containing the beginning of the second transmission gap of the pattern);
  $\Delta SIR2\_\text{coding}$=DeltaSIRafter2 if the current frame follows immediately after a frame containing the beginning of the second transmission of the pattern (DeltaSIRafter1 is a variation in target SIR in the up direction one frame after the frame containing the beginning of the second transmission gap of the pattern); and
  $\Delta SIR1\_\text{coding}$=0 dB and $\Delta SIR2\_\text{coding}$=0 dB in all other cases.

It should also be observed that if the values $DIR_{cm\_target}$ and $PO_{cm}$ obtained using the above relationships do not correspond to values that are allowed by the standard, then values are taken that are the closest to the values that are allowed, or the values that are immediately less than or greater than said values.

In addition, it should be observed that in the 3GPP standard, for the up direction, the values that are allowed for power offset PO are equal to 20 $\text{Log}(\beta_c/\beta_d)$ where $\beta_c$ is the gain factor of DPCCH and $\beta_d$ is the gain factor of DPDCH. With one of $\beta_c$ and $\beta_d$ being equal to 1 and the other one being an integer in the range 1 to 15.

In a method of the invention, in the event of a change in the required transmission conditions, a variation having a first value is applied to said target value and a variation having a second value is applied to said power offset so that said first channel has its transmission power changed by said second value and the second channel has its transmission power changed by a value equal to the difference between said first and second values.

In particular, when the change in required transmission conditions corresponds to using compressed mode, it is possible, in general manner, to distinguish between the following three implementations.

In a first implementation:
said first value is equal to 0;
the difference between said first and said second values corresponds to the variation in power to be applied to the second channel (said variation corresponding to $\Delta\text{SIR\_compression}+\Delta\text{SIR1\_coding}+\Delta\text{SIR2\_coding}$ when the second channel is constituted by the DPDCH in the example given above).

In a second implementation:
said first value corresponds to a component of the variation in the power to be applied to the first channel (said component corresponding to $\Delta_{PILOT}$ for the first channel being constituted by the DPCCH as in the example given above);
the difference between said first value and said second value is obtained from said component for the variation in power to be applied to the first channel, and from the variation in power to be applied to the second channel (said variation in power corresponding to $\Delta\text{SIR\_compression}+\Delta\text{SIR1\_coding}+\Delta\text{SIR2\_coding}$ when the second channel is constituted by the DPDCH as in the example given above).

In a third implementation:
said first value corresponds to a variation in power to be applied to the first channel (said variation in power corresponding to $\Delta_{PILOT}+\Delta\text{SIR1\_coding}+\Delta\text{SIR2\_coding}$ when the first channel is constituted by the DPCCH, as in the example given above); and
the difference between said first and second values is obtained from a component of the variation in power to be applied to the first channel (said component corresponding to $\Delta_{PILOT}$ when the first channel is constituted by the DPCCH as in the example given above) and a component for the variation in power to be applied to the second channel (said component corresponding to $\Delta\text{SIR\_compression}$ when the second channel is constituted by the DPDCH as in the example given above).

In a method of the invention, when a change is required in transmission conditions corresponding to the use of compressed mode, a variation is applied to said target value which comprises a component for compensating a change in the number of pilot bits for a pilot signal transmitted in said control channel, said number of pilot bits possibly differing between compressed frames and normal frames, together with a component for compensating the degradation in performance due to transmission gaps in compressed mode.

The present invention also provides various entities of a mobile radiocommunications system suitable for including means for implementing a method of the invention.

It is also possible to provide means for signaling between these various entities in order to implement a method of the invention.

In general, a mobile radiocommunications system comprises, as outlined in FIG. 4, the following entities: mobile stations (also referred to as user equipment (UE) in the UMTS), base stations (also referred to as "Node B" in the UMTS), and base station controllers (referred to UMTS as radio network controllers (RNC)). The system constituted by the "Node B" and the RNCs is itself also referred to as the UTRAN which stands for "UMTS terrestrial radio access network".

Generally, the outer power control loop is implemented rather in the receiver (Node B for the up direction, for example) since it is more logical to estimate the quality (BER, FER, BLER, . . . ) needed by the outer loop in a receiver. The variation in the target value $\Delta\text{SIR}$ should then be known to the receiver. However the anticipated variation in transmission power is to be applied in the transmitter (in the UE for the up direction, for example), and therefore also needs to be known to the transmitter.

In addition, in a system such as UMTS, the RNC is in charge of controlling the network and the actions performed by the UE, whereas the Node B is mainly a transceiver. Thus, the outer power control loop in the up direction is implemented in the RNC. The inner power control loop is implemented in part in the UE, and in part in the Node B; for example, in the up direction, the Node B compares the estimated SIR with the target SIR and sends a power control command to the UE, and the UE changes its transmission power as a function of the power control commands sent by the Node B.

Thus, the invention also provides a base station (or Node B in UMTS) for a mobile radiocommunications system, the base station including means (such a those referenced 1 in FIG. 4) for implementing a method of the invention.

Specifically, a base station of the invention may include the following means:
in order to control power in the up direction, means for applying a variation having said first value to said target value;
for controlling power in the down direction, means for applying a variation having said second value to said power offset; and
for controlling power in the up direction, means for signaling to a mobile station said second value for said variation to be applied to said power offset.

In particular, a base station of the invention may include the following means:
in order to control power in the up direction, means for applying to said target value (SIR target) a variation comprising a component ($\Delta_{PILOT}$) for compensating a change in the number of pilot bits for a pilot signal transmitted in said control channel, said number of pilot bits possibly differing between compressed frames and normal frames, together with a component ($\Delta\text{SIR1\_coding}+\Delta\text{SIR2\_coding}$) for compensating performance degradation due to the transmission gaps in compressed mode.

The invention also provides a base station controller (or RNC in UMTS) for a mobile radiocommunications system, said controller including means (such as those referenced 2 in FIG. 4) for implementing a method of the invention.

In particular, a base station controller of the invention may include the following means:
for controlling power in the up direction, means for applying a variation having said first value to said target value;
for controlling power in the down direction, means for applying a variation having said second value to said power offset; and
for controlling power in the up direction, means for signaling to said mobile station said second value for said variation to be applied to said power offset.

In particular, a base station controller of the invention may include the following means:
to control power in the up direction, means for applying a variation to said target value (SIR target), which variation comprises a component ($\Delta_{PILOT}$) for compensating a change in the number of pilot bits for a pilot signal transmitted in said control channel, said number of pilot bits possibly differing between compressed frames and normal frames together with a component ($\Delta SIR1\_coding+\Delta SIR2\_coding$) for compensating the degradation in performance due to the transmission gaps in compressed mode.

The invention also provides a mobile station (or UE in UMTS) for a mobile radiocommunications system, the mobile station including means for implementing a method of the invention (such as the means referenced 3 in FIG. 4).

In particular, a mobile station of the invention may include the following means:
for controlling power in the down direction, means for applying a variation having said first value to said target value;
for controlling power in the up direction, means for applying a variation having said second value to said power offset; and
for controlling power in the down direction, means for signaling to the network said variation having said second value for application to said power offset.

In particular, a mobile station of the invention may include the following means:
for controlling power in the down direction, means for applying to said target value (SIR target) a variation comprising a component ($\Delta_{PILOT}$) for compensating a change in the number of pilot bits for a pilot signal transmitted in said control channel, where said number of pilot bits may differ between compressed frames and normal frames, together with a component ($\Delta SIR1\_coding+\Delta SIR2\_coding$) for compensating the performance degradation due to the transmission gaps in compressed mode.

The particular implementation of these various means does not present any particular difficulty for the person skilled in the art, so such means do not need to be described herein in greater detail than the above description where they are described by function.

The invention claimed is:

1. A method of controlling transmission power in a mobile radiocommunications system, in which two distinct physical channels transmitted by a single transmitter have their respective transmission powers controlled by a power control algorithm as a function of a target value for transmission quality corresponding to a first channel which is taken as a reference, and in which, for a second channel, a transmission power offset relative to the first channel is applied, the method being characterized in that when there is a change in the required transmission conditions, a variation having a first value is applied to said target value, and a variation having a second value is applied to said power offset so that said first channel has its transmission power changed by said first value and the second channel has its transmission power changed by a value equal to the difference between said first and second values.

2. A method according to claim 1, characterized in that:
said first value is equal to 0; and
the difference between said first and second values corresponds to the variation in power to be applied to the second channel.

3. A method according to claim 1, characterized in that:
said first value corresponds to a component of the variation in the power to be applied to the first channel; and
the difference between said first and second values corresponds to the difference between said power variation component to be applied to the first channel and the power variation to be applied to the second channel.

4. A method according to claim 3, characterized in that said change in required transmission conditions corresponds to using compressed mode, and said first channel corresponding to a control channel, said power variation component to be applied to the control channel is a component ($\Delta_{PILOT}$) for compensating a change in the number of pilot bits for a pilot channel transmitted in said control channel, in compresses frames as compared to normal frames.

5. A method according to claim 1, characterized in that:
said first value corresponds to the power variation to be applied to the first channel; and
the difference between said first and second values corresponds to the difference between a power variation component to be applied to the first channel and a power variation component to be applied to the second channel.

6. A method according to claim 5, characterized in that, said change in required transmission conditions corresponds to using compressed mode, and said first channel corresponding to a control channel, and in that said power variation to be applied to the control channel comprises a component ($\Delta_{PILOT}$) for compensating a change in the number of pilot bits for a pilot signal transmitted in said control channel, in compressed frames as compared to normal frames, together with a component ($\Delta SIR1\_coding+\Delta SIR2\_coding$) for compensating the performance degradation due to the transmission gaps in compressed mode.

7. A method according to claim 1, characterized in that said change in required transmission conditions corresponds to using compressed mode.

8. A method according to claim 1, characterized in that said first channel is a control channel.

9. A method according to claim 1, characterized in that said second channel is a data channel.

10. A method according to claim 1, characterized in that it is used for controlling power in the up direction.

11. A method according to claim 1, characterized in that it is used for controlling power in the down direction.

12. A base station comprising means for performing a power control algorithm for controlling the transmission power of two distinct physical channels transmitted by a same transmitter, as a function of a target value for transmission quality (SIR target) corresponding to a first channel which is taken as a reference, and with a second channel having its transmission power offset relative to the first channel by a transmission power offset (PO),
characterized in that in order to control power in the up direction, it comprises means for, when there is a change in the required transmission conditions, applying a variation having said a first value to said target value (SIR target), so that, with a variation having a second value applied to said power offset (PO), said first channel has its transmission power changed by said first value and said second channel has its transmission power changed by a value equal to the difference between said first value and said second value.

13. A base station according to claim 12, characterized in that in order to control power in the up direction, it comprises means for signaling to a mobile station said variation having said second value for application to said power offset (PO).

14. A base station controller according to claim 13, characterized in that in order to control power in the up direction, it comprises means for, when there is a change in the required transmission conditions, signaling to a mobile station said variation having said second value to be applied to said power offset (PO).

15. A mobile radiocommunications system comprising at least one base station in accordance with claim 12.

16. A base station comprising means for performing a power control algorithm for controlling the transmission power of two distinct physical channels transmitted by a same transmitter, as a function of a target value for transmission quality (SIR target) corresponding to a first channel which is taken as a reference, and with a second channel having its transmission power offset relative to the first channel by a transmission power offset (PO), characterized in that in order to control power in the down direction, it comprises means for, when there is a change in the required transmission conditions, applying a variation having a second value to said power offset (PO), so that, with a variation having a first value applied to said target value (SIR target), said first channel has its transmission power changed by a first value and said second channel has its transmission power changed by a value equal to the difference between said first value and said second value.

17. A base station controller comprising means for performing a power control algorithm for controlling the transmission power of two distinct physical channels transmitted by a same transmitter, as a function of a target value for transmission quality (SIR target) corresponding to a first channel which is taken as a reference, and with a second channel having its transmission power offset relative to the first channel by a transmission power offset (PO), characterized in that in order to control power in the up direction, it comprises means for, when there is a change in the required transmission conditions, applying a variation having a first value to said target value (SIR target), so that, with a variation having a second value applied to said power offset (PO), said first channel has its transmission power changed by said first value and said second channel has its transmission power changed by a value equal to the difference between said first value and said second value.

18. A mobile radiocommunications system including at least one base station controller in accordance with claim 17.

19. A base station controller comprising means for performing a power control algorithm for controlling the transmission power of two distinct physical channels transmitted by a same transmitter, as a function of a target value for transmission quality (SIR target) corresponding to a first channel which is taken as a reference, and with a second channel having its transmission power offset relative to the first channel by a transmission power offset (PO), characterized in that in order to control power in the down direction, it comprises means for, when there is a change in the required transmission conditions, applying a variation having a second value to said power offset (PO), so that, with a variation having a first value applied to said target value (SIR target), said first channel has its transmission power changed by a first value and said second channel has its transmission power changed by a value equal to the difference between said first value and said second value.

20. A mobile station according to claim 19, characterized in that in order to control power in the down direction, it comprises means for signaling to the network said variation having said second value for application to said power offset (PO).

21. A mobile station comprising means for performing a power control algorithm for controlling the transmission power of two distinct physical channels transmitted by a same transmitter, as a function of a target value for transmission quality (SIR target) corresponding to a first channel which is taken as a reference, and with a second channel having its transmission power offset relative to the first channel by a transmission power offset (PO), characterized in that in order to control power in the down direction, it comprises means for, when there is a change in the required transmission conditions, applying a variation having a first value to said target value (SIR target), so that, with a variation having a second value applied to said power offset (PO), said first channel has its transmission power changed by said first value and said second channel has its transmission power changed by a value equal to the difference between said first value and said second value.

22. A mobile radiocommunications system including at least one mobile station in accordance with claim 21.

23. A mobile station comprising means for performing a power control algorithm for controlling the transmission power of two distinct physical channels transmitted by a same transmitter, as a function of a target value for transmission quality (SIR target) corresponding to a first channel which is taken as a reference, and with a second channel having its transmission power offset relative to the first channel by a transmission power offset (PO), characterized in that, in order to control power in the up direction, it includes means for, when there is a change in the required transmission conditions, applying a variation having a second value to said power offset (PO), so that, with a variation having a first value applied to said target value (SIR target), said first channel has its transmission power changed by a first value and said second channel has its transmission power changed by a value equal to the difference between said first value and said second value.

24. A method of controlling transmission power in a mobile radiocommunications system, in which a data channel (DPDCH) and a control channel (DPCCH) transmitted by a single transmitter have their respective transmission powers controlled by a power control algorithm as a function of a target value for transmission quality (SIR target) corresponding to the control channel which is taken as a reference, and in which, for the data channel, a transmission power offset (PO) relative to the control channel is applied, which method is characterized in that in the event of a change in transmission conditions being required, corresponding to using compressed mode, a variation is applied to said target value (SIR target), said variation comprising a component ($\Delta_{PILOT}$) for compensating a change in the number of pilot bits for a pilot signal transmitted in said control channel, in compressed frames as compared to normal frames, together with a component ($\Delta SIR1\_coding+$ ΔSIR2_coding) for compensating the performance degradation due to the transmission gaps in compressed mode.

25. A base station comprising means for performing a power control algorithm for controlling the transmission power of a data channel (DPDCH) and a control channel (DPCCH) transmitted in uplink by a mobile station, as a function of a target value for transmission quality (SIR target) corresponding to the control channel which is taken as a reference, and with the data channel having its transmission power offset relative to the control channel by a transmission power offset (PO), characterized in that it comprises, for power control in the uplink, menas for, in compressed mode, applying a variation to said target value (SIR target), which variation comprises a component ($\Delta_{PILOT}$) for compensating a change in the number of pilot bits for a pilot signal transmitted in said control channel, in compressed frames as compared to normal frames, together with a component (ΔSIR1_coding+ΔSIR2_coding) for compensating the performance degradation due to the transmission gaps in compressed mode.

26. A base station controller comprising means for performing a power control algorithm for controlling the transmission power of a data channel (DPDCH) and a control channel (DPCCH) transmitted by a same transmitter, as a function of a target value for transmission quality (SIR target) corresponding to the control channel which is taken as a reference, and with the data channel having its transmission power offset relative to the control channel by a transmission power offset (PO), characterized in that, in order to control power in the up direction, it comprises means for, in the event of a change transmission conditions being required, corresponding to using compressed mode, applying a variation to said target value (SIR target), which variation comprises a component ($\Delta_{PILOT}$) for compensating a change in the number of pilot bits for a pilot signal transmitted in said control channel, in compressed frames as compared to normal frames, together with a component (ΔSIR1_coding+ΔSIR2_coding) for compensating the performance degradation due to the transmission gaps in compressed mode.

27. A mobile station comprising means for performing a power control algorithm for controlling the transmission power of a data channel (DPDCH) and a control channel (DPCCH) transmitted by a same transmitter, as a function of a target value for transmission quality (SIR target) corresponding to the control channel which is taken as a reference, and with the data channel having its transmission power offset relative to the control channel by a transmission power offset (PO), characterized in that, in order to conrol power in the down direction, it comprises means for, in the event of a change in transmission conditions being required, corresponding to using compressed mode, applying a variation to said target value (SIR target), said variation comprising a component ($\Delta_{PILOT}$) for compensating a change in the number of pilot bits for a pilot signal transmitted in said control channel, it compressed frames as compared to normal frames, together with a component (ΔSIR1_coding+ΔSIR2_coding) for compensating the degradation in performance due to the transmission gaps in compressed mode.

* * * * *